(12) United States Patent
Yuh (10) Patent No.: US 7,559,781 B2
(45) Date of Patent: Jul. 14, 2009

(54) DISK-MOUNTING ASSEMBLY FOR MOUNTING REMOVABLY A DISK DRIVE IN AN ELECTRONIC DEVICE

(75) Inventor: Yi-Fan Yuh, Taipei Hsien (TW)

(73) Assignee: Datastore Technology Co., Ltd., Taipei Hsien (TW)

( * ) Notice: Subject to any disclaimer, the term of this patent is extended or adjusted under 35 U.S.C. 154(b) by 63 days.

(21) Appl. No.: 11/851,758

(22) Filed: Sep. 7, 2007

(65) Prior Publication Data

US 2008/0067908 A1 Mar. 20, 2008

(30) Foreign Application Priority Data

Sep. 18, 2006 (TW) .............................. 95216606 U (51) Int. Cl.
*H01R 13/62* (2006.01)
(52) U.S. Cl. ...................................... 439/159; 361/754
(58) Field of Classification Search ................. 439/159, 439/160, 155, 153; 361/729, 754
See application file for complete search history.

(56) References Cited

U.S. PATENT DOCUMENTS

| | | | | |
|---|---|---|---|---|
| 4,914,552 A | * | 4/1990 | Kecmer ...................... | 361/801 |
| 5,644,470 A | * | 7/1997 | Benedict et al. ............. | 361/686 |
| 6,128,196 A | * | 10/2000 | Hoyle et al. ................. | 361/752 |
| 6,419,508 B2 | * | 7/2002 | Hashimoto .................. | 439/159 |
| 6,625,039 B2 | * | 9/2003 | Barringer et al. ............ | 361/800 |
| 6,798,650 B2 | * | 9/2004 | Reznikov et al. ............ | 361/685 |

* cited by examiner

*Primary Examiner*—Neil Abrams
*Assistant Examiner*—Phuong Nguyen
(74) *Attorney, Agent, or Firm*—Leong C. Lei (57) ABSTRACT

A disk-mounting assembly includes a casing, a releasing unit, and a cover. The casing defines a front opening and is formed with an elongated through-hole. The releasing unit includes a releasing member and a pushing member. The releasing member extends movably through the front opening. The pushing member extends from the releasing member into the casing through the elongated through-hole. The cover is coupled pivotably to the casing and the releasing member, and is operable so as to cover and uncover the front opening in the casing.

6 Claims, 8 Drawing Sheets

DISK-MOUNTING ASSEMBLY FOR MOUNTING REMOVABLY A DISK DRIVE IN AN ELECTRONIC DEVICE

CROSS-REFERENCE TO RELATED APPLICATION

This application claims priority of Taiwanese application no. 095216606, filed on Sep. 18, 2006.

BACKGROUND OF THE INVENTION

1. Field of the Invention

The invention relates to a disk-mounting assembly for mounting removably a disk drive in an electronic device.

2. Description of the Related Art

Figure 1:
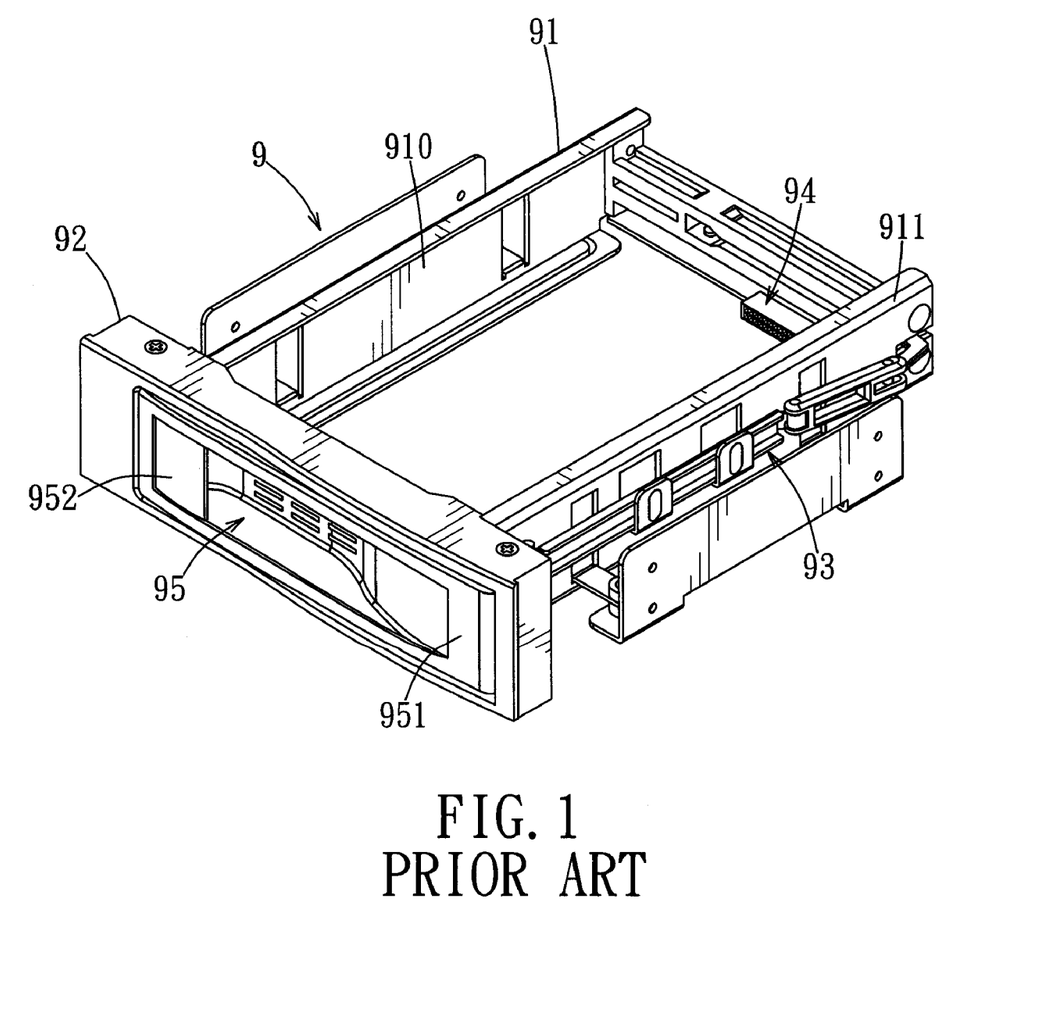
FIG. 1 is a perspective view of a conventional disk-mounting assembly.
Figure 2:
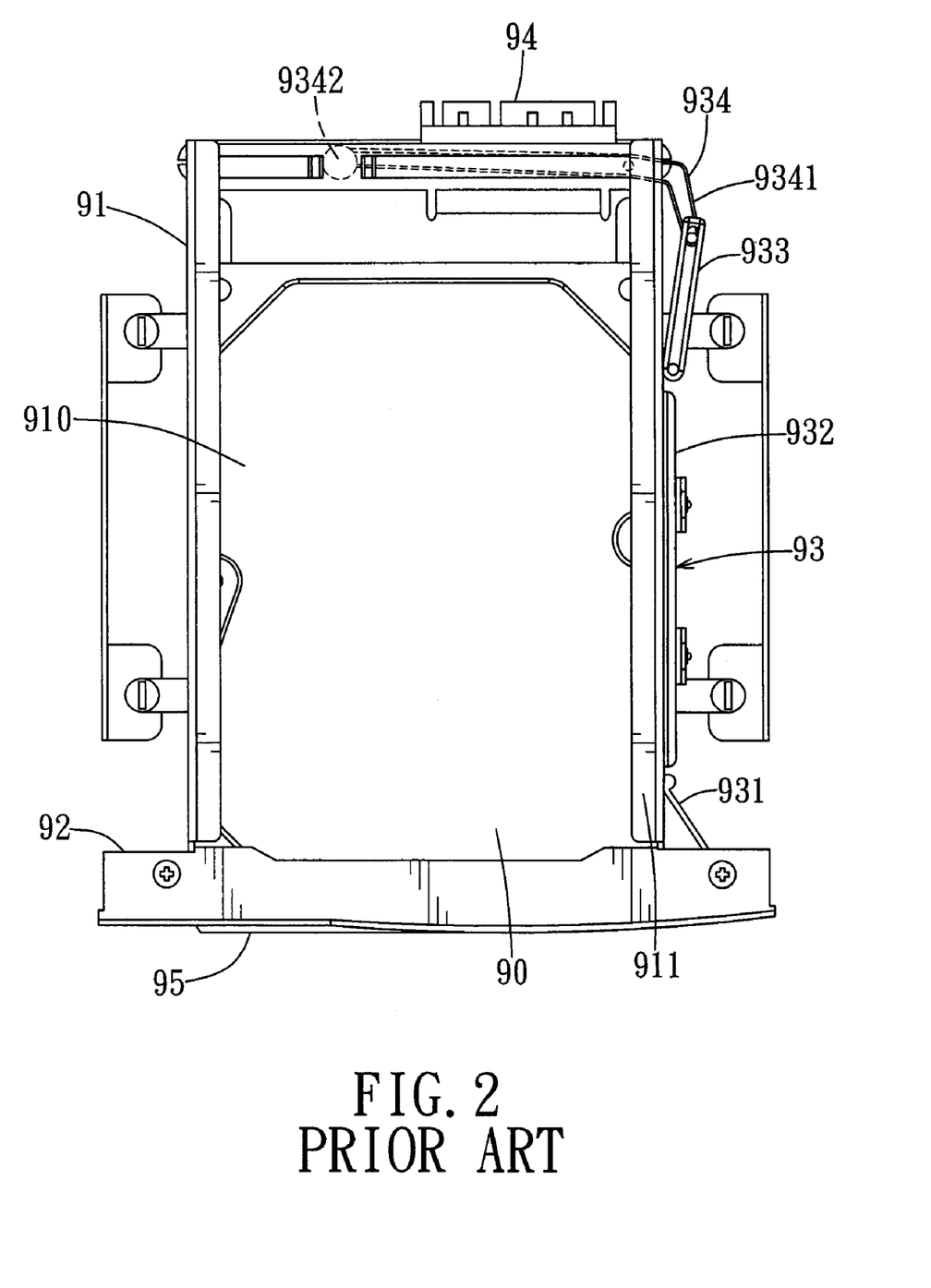
FIG. 2 is a schematic view of the conventional disk-mounting assembly, shown in a state with a disk drive mounted therein.

Disk-mounting assemblies that permit installation and removal of a disk drive in and from an electronic device, such as a personal computer, are well known in the art. One such conventional disk-mounting assembly is disclosed in Taiwanese Patent Application No. 94708011. As shown in FIGS. 1 and 2, the conventional disk-mounting assembly includes a casing 9, an electrical connector 94, a cover 95, and a releasing unit 93.

The casing 9 includes a tray 91 and a frame 92. The tray 91 of the casing 9 defines an accommodating space 910. The frame 92 of the casing 9 is fastened to the tray 91, and defines a front opening (not shown) that is in spatial communication with the accommodating space 910 in the tray 91.

The electrical connector 94 is mounted on the tray 91, and is coupled electrically to a terminal (not shown) of a disk drive 90 when the disk drive 90 is received in the accommodating space 910 in the tray 91.

The cover 95 is operable so as to cover and uncover the front opening in the frame 92, and has a pivot end portion 951 that is coupled pivotably to the frame 92, and a free end portion 952 that is opposite to the pivot end portion 951 thereof.

The releasing unit 93 includes first, second, and third releasing members 931, 932, 933, and a pushing member 934. The first releasing member 931 is coupled pivotably to the pivot end portion 951 of the cover 95. The second releasing member 932 is coupled pivotably to the first releasing member 931 and is coupled slidably to a lateral wall 911 of the tray 91. The third releasing member 933 is coupled pivotably to the second releasing member 932. The pushing member 934 extends into the accommodating space 910 in the tray 91 through the lateral wall 911 of the tray 91, and has a pivot end 9341 that is coupled pivotably to the third releasing member 933, and a free end 9342 that is disposed in the accommodating space 910 in the tray 91.

Figure 3:
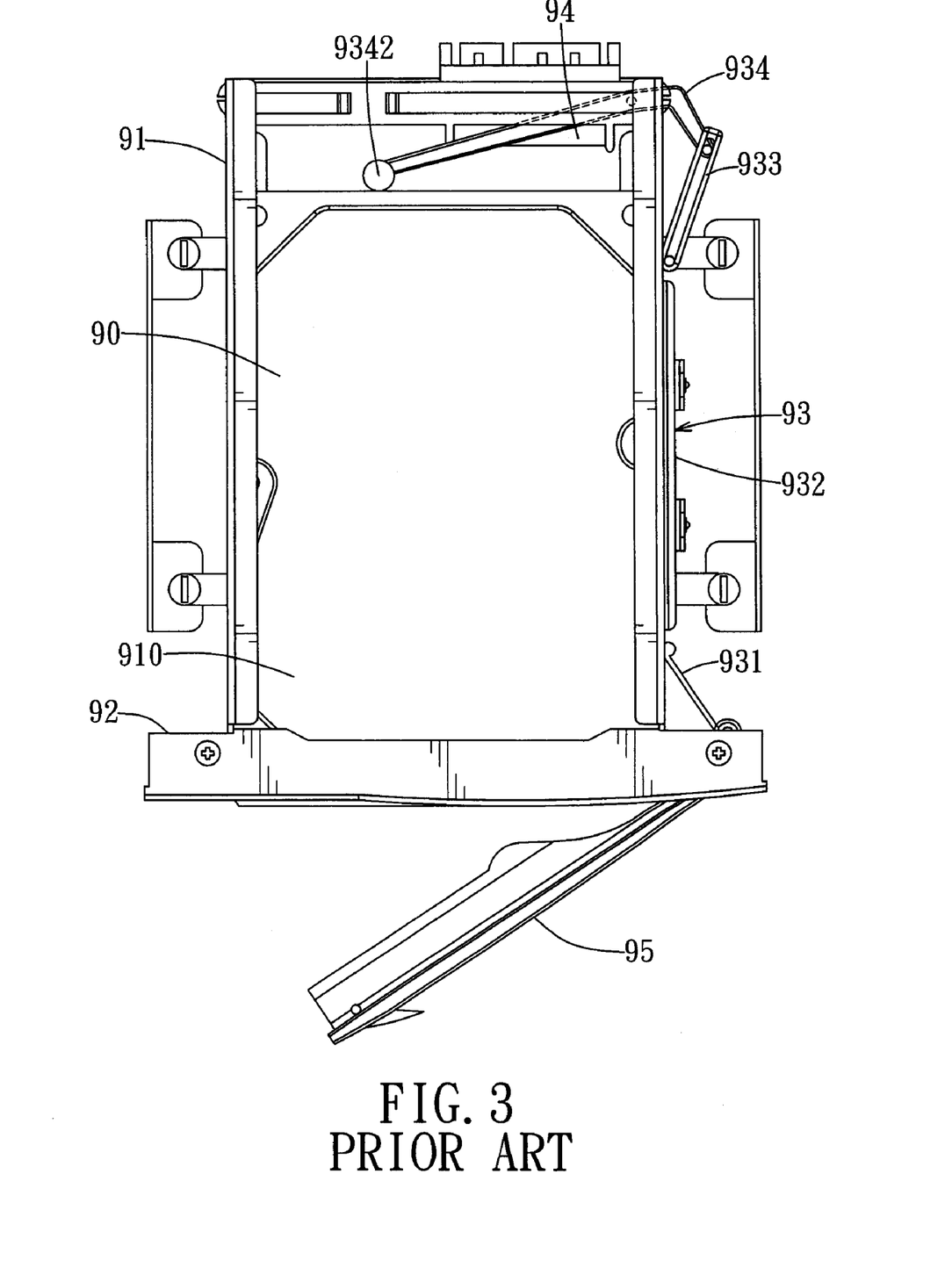
FIG. 3 is a schematic view to illustrate operation of the conventional disk-mounting assembly for removing the disk drive therefrom.

In use, when the cover 95 is operated to cover the front opening in the frame 92, this results in corresponding relative rotations of the first, second, and third releasing members 931, 932, 933, and the pushing member 934 such that the free end 9342 of the pushing member 934 moves in a direction away from the front opening in the frame 92, as best shown in FIG. 2. On the other hand, when the cover 95 is operated to uncover the front opening in the frame. 92, this results in corresponding relative rotations of the first, second, and third releasing members 931, 932, 933, and the pushing member 934 such that the free end 9342 of the pushing member 934 moves in a direction toward the front opening in the frame 92, as best shown in FIG. 3.

Although the aforementioned conventional disk-mounting assembly achieves its intended purpose, the releasing unit 93 thereof is complicated in structure.

SUMMARY OF THE INVENTION

Therefore, the object of the present invention is to provide a disk-mounting assembly that includes a releasing unit, which has a relatively simple structure.

According to the present invention, a disk-mounting assembly for mounting a disk drive includes a casing, a releasing unit, and a cover. The casing defines an accommodating space, and a front opening that is in spatial communication with the accommodating space, and is formed with an elongated through-hole that is in spatial communication with the accommodating space. The releasing unit includes a releasing member and a pushing member. The releasing member extends movably through the front opening in the casing, and has opposite pivot and free ends. The pushing member is coupled to the free end of the releasing member so as to be co-movable therewith, and extends into the accommodating space in the casing through the elongated through-hole in the casing. The releasing member is movable relative to the casing between a first position, where the pushing member is disposed distal from the front opening in the casing, and a second position, where the pushing member is disposed proximate to the front opening in the casing. The cover is coupled pivotably to the casing and the pivot end of the releasing member of the releasing unit, and is pivotable relative to the casing between a closed position, where the cover covers the front opening in the casing and where the releasing member of the releasing unit is disposed at the first position, and an open position, where the cover uncovers the front opening in the casing and where the releasing member of the releasing unit is disposed at the second position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
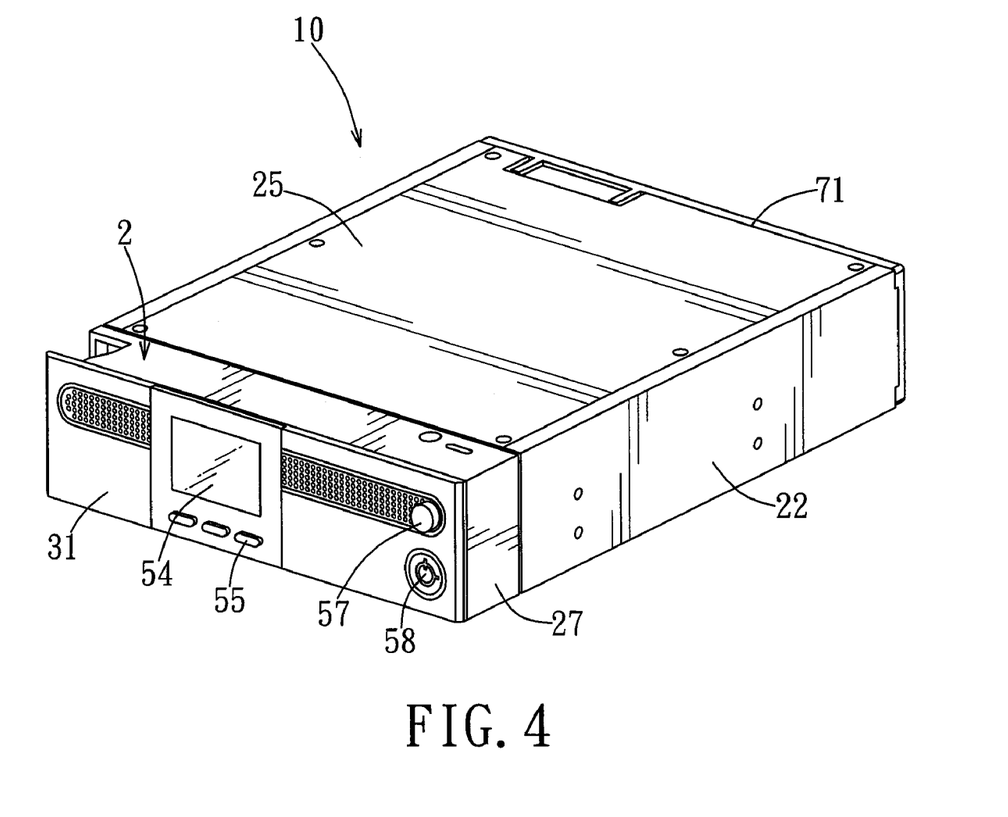
FIG. 4 is a perspective view of the preferred embodiment of a disk-mounting assembly according to the present invention.
Figure 5:
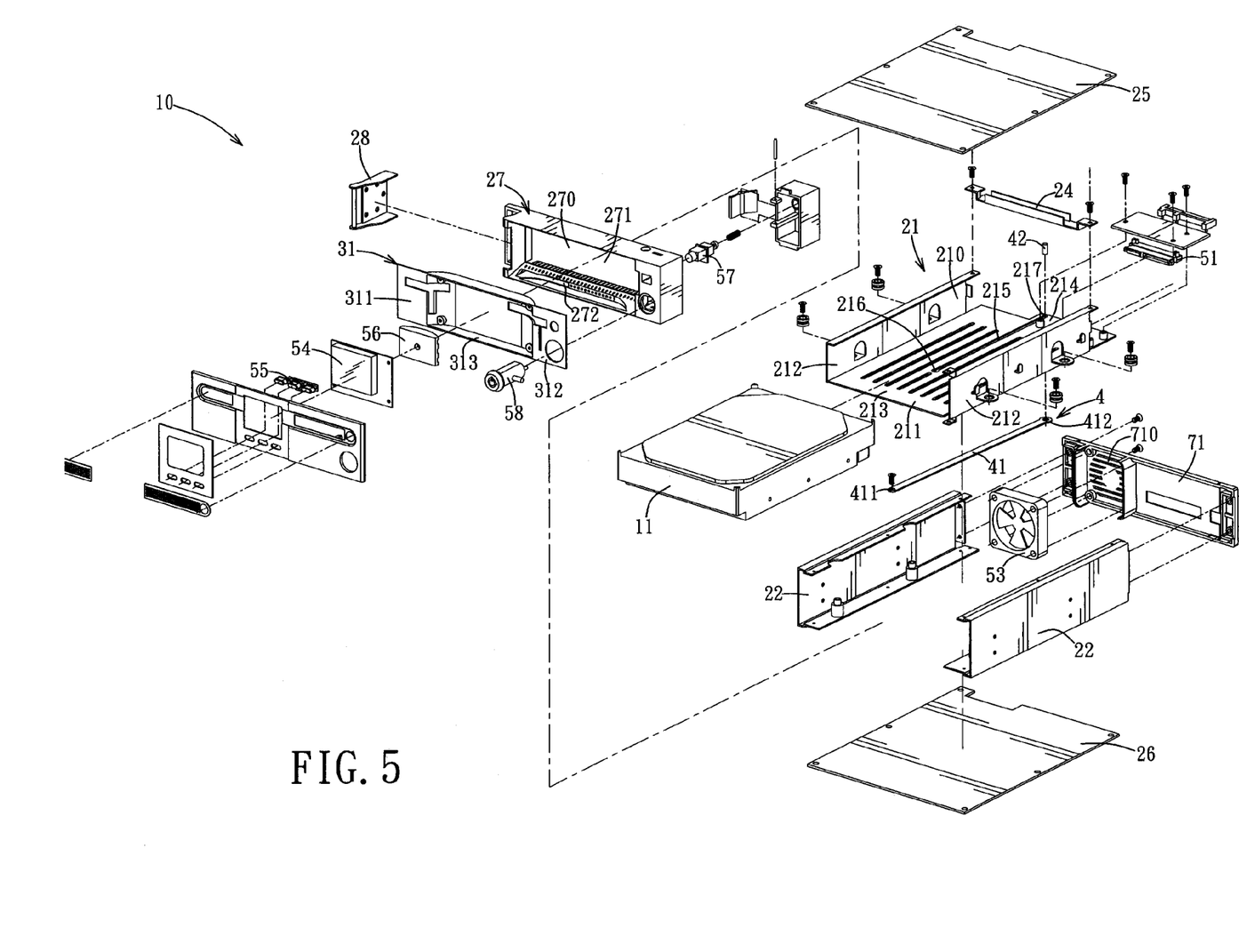
FIG. 5 is an exploded perspective view of the preferred embodiment.

Referring to FIGS. 4 and 5, the preferred embodiment of a disk-mounting assembly 10 according to this invention is shown to include a casing 2, a front cover 31, and a releasing unit 4.

The disk-mounting assembly 10 of this embodiment is applicable for mounting removably a disk drive 11 in an electronic device (not shown), such as a personal computer, in a manner that will be described hereinafter.

The casing 2 includes a tray 21 and a frame 27. The tray 21 of the casing 2 has front and rear ends 213, 214, and includes a pair of lateral walls 212, and an interconnecting wall 211 that interconnects the lateral walls 212 and that cooperates with the lateral walls 212 to define an accommodating space 210. In this embodiment, the interconnecting wall 211 of the tray 21 of the casing 2 is formed with an elongated through-hole 215 that is in spatial communication with the accommodating space 210 in the tray 21. The frame 27 of the casing 2 is disposed on the front end 213 of the tray 21, is fastened on the lateral walls 212 of the tray 21, and defines a front opening 270. In this embodiment, the front opening 270 in the frame 27 of the casing 2 has an upper end portion 271 that is in spatial communication with the accommodating space 210 in the tray 21, and a lower end portion 272 that is opposite to the upper end portion 271 thereof.

The elongated through-hole 215 in the interconnecting wall 211 of the tray 21 of the casing 2 has opposite front and rear ends 216, 217 that are respectively proximate to and distal from the frame 27 of the casing 2.

Figure 6:
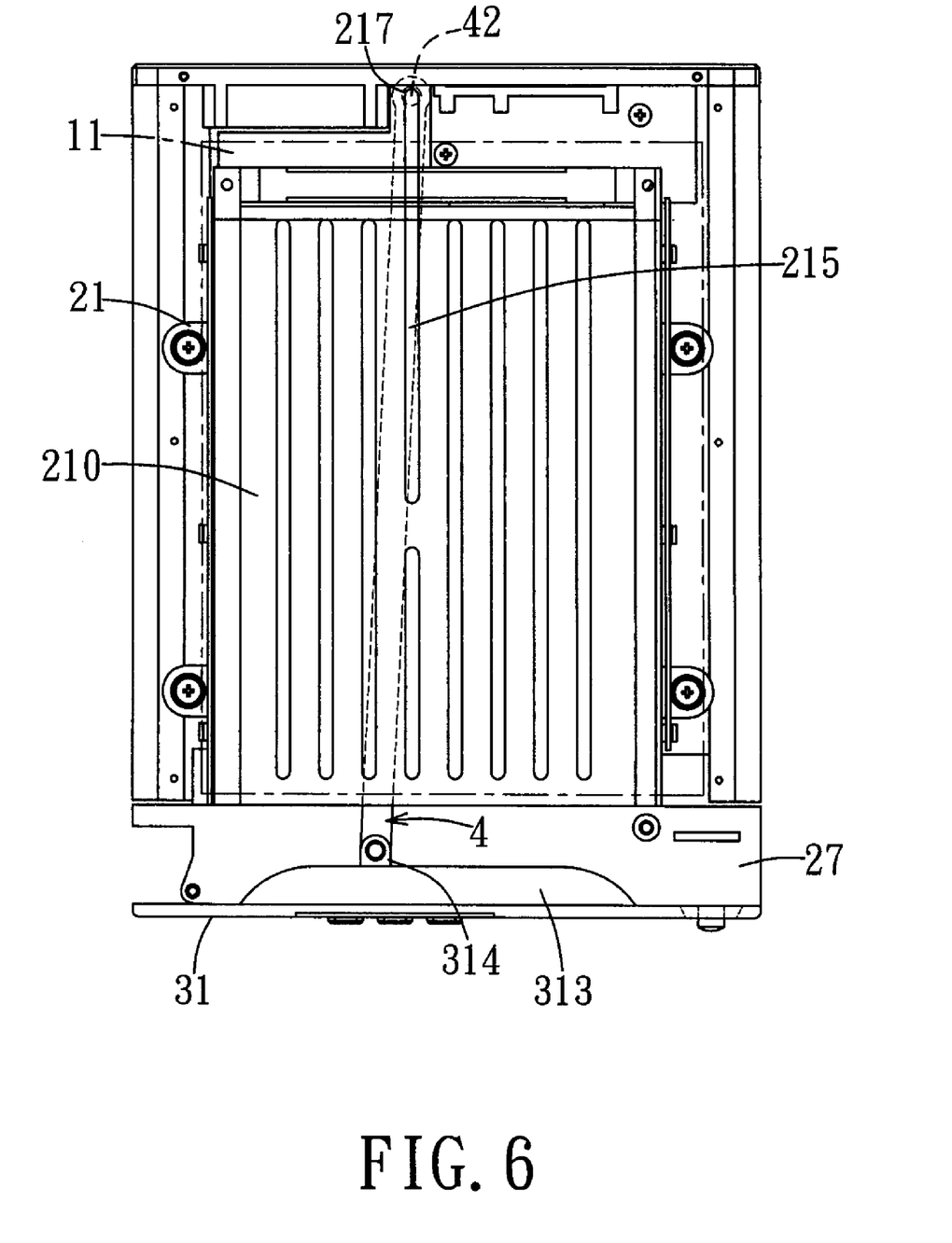
FIG. 6 is a schematic view of the preferred embodiment, shown in a state with a disk drive mounted therein.

It is noted that when the disk drive 11 is received in the accommodating space 210 in the tray 21, the rear end 217 of the elongated through-hole 215 is disposed behind the disk drive 11, as best shown in FIG. 6.

The casing 2 further includes a pair of brackets 22, each of which is disposed externally of the tray 21 and is fastened to a respective one of the lateral walls 212 of the tray 21.

The disk-mounting assembly 10 of this invention is disposed in a disk drive bay (not shown) of the electronic device, and the brackets 22 are fastened to the disk drive bay. In an alternative embodiment, the disk-mounting assembly 10 may be disposed externally of the electronic device.

The releasing unit 4 includes a releasing member 41 and a pushing member 42. The releasing member 41 of the releasing unit 4 extends movably through the lower end portion 272 of the front opening 270 in the frame 27 of the casing 2, and has opposite pivot and free ends 411, 412. The pushing member 42 of the releasing unit 4 engages threadedly and directly the free end 412 of the releasing member 41 so as to be co-movable therewith, and extends into the accommodating space 210 in the tray 21 of the casing 2 through the elongated through-hole 215 in the interconnecting wall 211 of the tray 21 of the casing 2.

In this embodiment, the releasing member 41 of the releasing unit 4 is movable relative to the casing 2 between a first position, where the pushing member 42 is disposed distal from the front opening 270 in the frame 27 of the casing 2, and a second position, where the pushing member 42 is disposed proximate to the front opening 270 in the frame 27 of the casing 2.

It is noted that the pushing member 42 is disposed at the rear end 217 of the elongated through-hole 215 when the releasing member 41 is disposed at the first position.

The front cover 31 is coupled pivotably to the frame 27 of the casing 2. In particular, the disk-mounting assembly 10 further includes a coupler 28 coupled fixedly to the tray 21 and the frame 27 of the casing 2. The front cover 31 has a pivot end portion 311, a free end portion 312 that is opposite to the pivot end portion 311 thereof, and a middle portion 313 that interconnects the pivot and free end portions 311, 312 thereof. The pivot end portion 311 of the front cover 31 is connected pivotably to the coupler 28. The front cover 31 is provided with a tongue 314 (see FIG. 6) that extends outwardly from the middle portion 313 thereof and that is connected pivotably and directly to the pivot end 411 of the releasing member 41 of the releasing unit 4.

In this embodiment, the front cover 31 is pivotable relative to the frame 27 of the casing 2 between a closed position, where the front cover 31 covers the upper and lower end portions 271, 272 of the front opening 270 in the frame 27 of the casing 2 and where the releasing member 41 of the releasing unit 4 is disposed at the first position, and an open position, where the front cover 31 uncovers the upper and lower end portions 271, 272 of the front opening 270 in the frame 27 of the casing 2 and where the releasing member 41 of the releasing unit 4 is disposed at the second position.

It is noted that the middle portion 313 of the front cover 31 extends into the upper end portion 271 of the front opening 270 in the frame 27 of the casing 2 when the front cover 31 is disposed at the closed position.

The disk-mounting assembly 10 further includes a rear cover 71 that is disposed at the rear end 214 of the tray 21 and that is fastened to the brackets 22, and an electrical connector 51 that is mounted on the rear cover 71, that is coupled electrically to the electronic device, and that is coupled electrically to a terminal (not shown) of the disk drive 11 when the disk drive 11 is received in the accommodating space 210 in the tray 21 of the casing 2.

Figure 7:
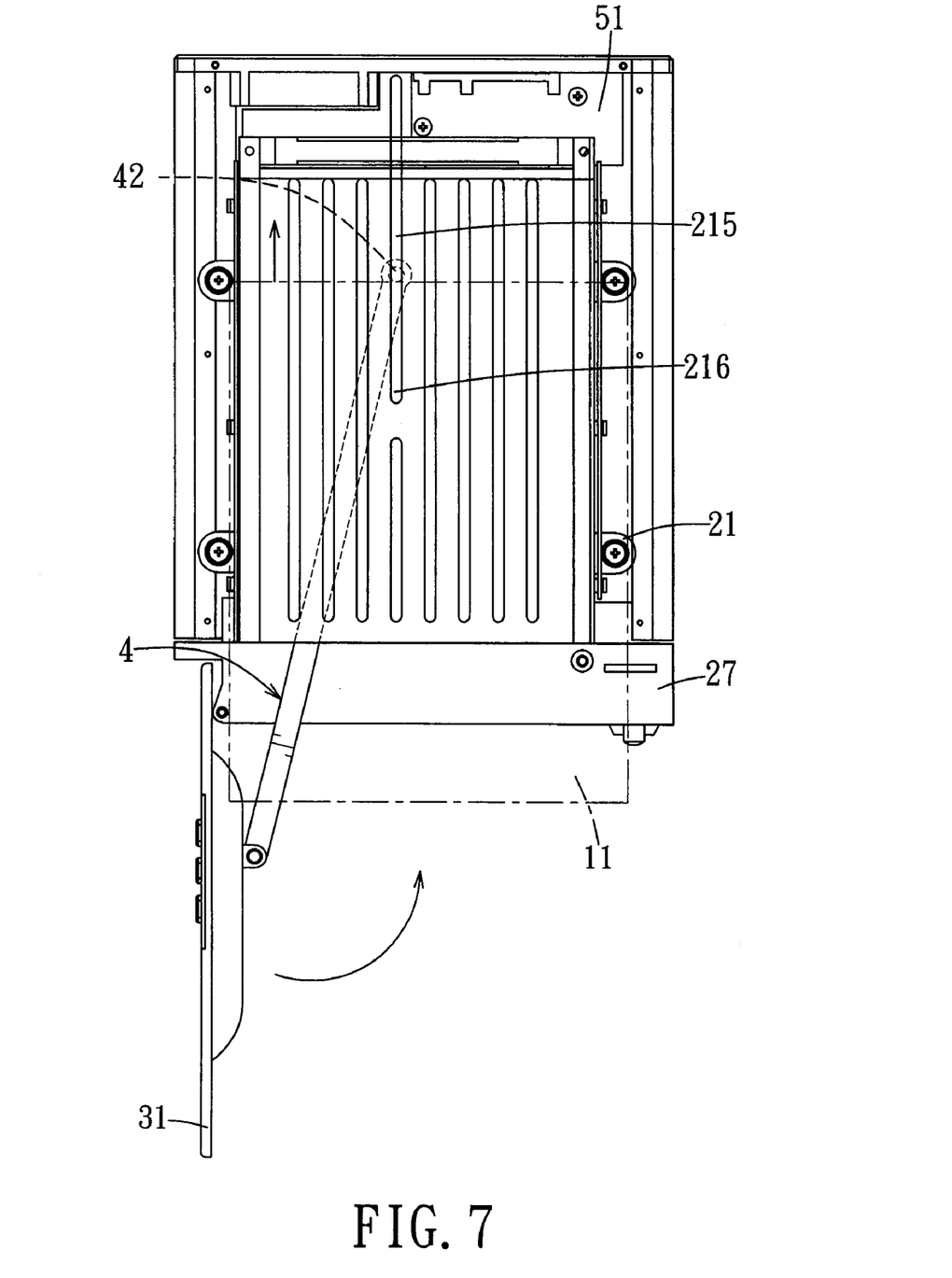
FIG. 7 is a schematic view to illustrate operation of the preferred embodiment for removing the disk drive therefrom.

In use, when it is desired to install the disk drive 11 in the electronic device, as shown in FIG. 7, the disk drive 11 is first partially inserted into the accommodating space 210 (see FIG. 5) in the tray 21 through the upper end portion 271 (see FIG. 5) of the front opening 270 (see FIG. 5) in the frame 27. The front cover 31 is then disposed at the closed position. During this operation, as best shown in FIG. 6, the middle portion 313 of the front cover 31 pushes the entire disk drive 11 into the accommodating space 210 in the tray 21. Thereafter, when it is desired to remove the disk drive 11 from the electronic device, the front cover 31 is first disposed at the open position. During this operation, as best shown in FIG. 7, the pushing member 42 slides along the elongated through-hole 215 toward the front end 216 of the elongated through-hole 215, and thereby pushes the disk drive 11 such that the terminal of the disk drive 11 is disconnected from the electrical connector 51 and such that the disk drive 11 extends out of the tray 21 through the upper end portion 271 (see FIG. 5) of the front opening 270 (see FIG. 5) in the frame 27.

Referring back to FIGS. 4 and 5, the disk-mounting assembly 10 further includes a reinforcing unit 24, top and bottom covers 25, 26, a cooling fan 53, a retaining unit 57, and a locking unit 58.

Figure 8:
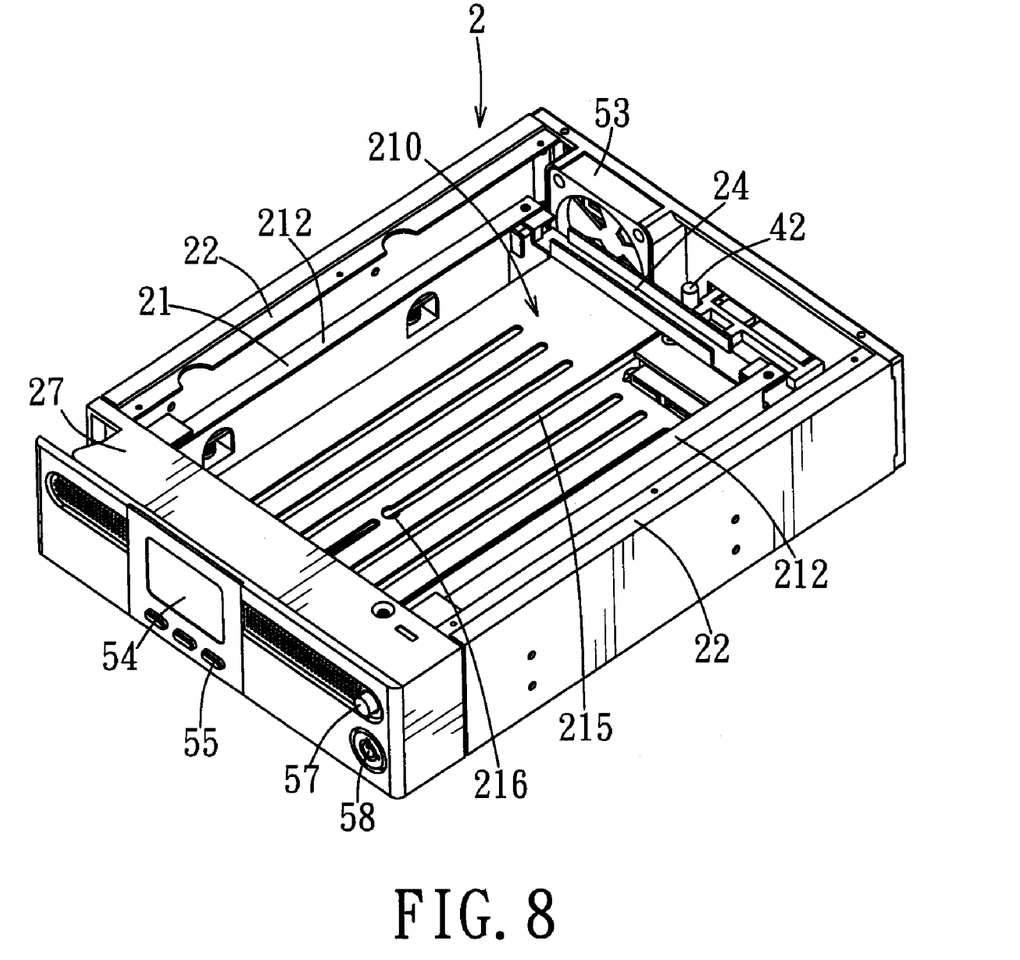
FIG. 8 is a perspective view to illustrate a retaining unit and a locking unit of the preferred embodiment.

With further reference to FIG. 8, the reinforcing unit 24 is disposed at the rear end 214 of the tray 21 and is fastened to the lateral walls 212 of the tray 21 for strengthening the structure of the tray 21.

The top cover 25 is disposed above the tray 21, is fastened to the brackets 22, and defines a side of the accommodating space 210 in the tray 21.

The bottom cover 26 is disposed under the tray 21, is fastened to the brackets 22, and cooperates with the interconnecting wall 211 of the tray 21 to define an insertion space (not shown).

The lower end portion 272 of the front opening 270 in the frame 27 is in spatial communication with the insertion space (not shown).

The free end 412 of there leasing member 41 is disposed in the insertion space.

The rear cover 71 is formed with a plurality of fan holes 710 that are in spatial communication with the accommodating space 210 in the tray 21, and is fastened to the brackets 22.

The cooling fan 53 is disposed in the accommodating space 210 in the tray 21, is mounted on the rear cover 71, is coupled electrically to the electrical connector 51, and is operable so as to draw air into the accommodating space 210 in the tray 21 and so as to expel the air out of the tray 21 through the fan holes 710.

The retaining unit 57 is mounted on the tray 21 and the frame 27 of the casing 2, and is operable so as to retain releasably the front cover 31 at the closed position. Since the construction of the retaining unit 57 is known to those skilled in the art, a detailed description of the same will be dispensed with herein for the sake of brevity.

The locking unit 58 is mounted on the tray 21 and the frame 27 of the casing 2, and is operable so as to lock the front cover 31 at the closed position for preventing unauthorized removal of the disk drive 11 from the disk-mounting assembly 10 of this invention. Since the feature of the present invention does not reside in the specific configuration of the locking unit 58, which is conventional in construction, a detailed description of the same is omitted herein for the sake of brevity.

The disk-mounting assembly 10 further includes a controller module 56 mounted on the front cover 31 and coupled electrically to the electrically connector 51, a display 54 mounted on the front cover 31 and coupled electrically to the controller module 56, and a plurality of push buttons 55, each of which is mounted on the front cover 31 and is coupled electrically to the controller module 56.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A disk-mounting assembly for mounting a disk drive comprising:
    a tray having a front and a rear ends and including a pair of lateral walls and interconnecting wall that interconnects said lateral walls and the cooperates with said lateral walls to define an accommodating space, said interconnecting wall being formed with an elongated throughhole;
    a frame disposed on said front end of said tray and fastened on said lateral walls of said tray and defining a front opening, said front opening having an upper end portion and a lower end portion;
    a pair of brackets disposed externally of said tray and each fastened to a respective one of said lateral walls;
    a releasing unit including a releasing member and a pushing member, said releasing member extending movably through said lower end portion of said front opening of said frame and having two opposite pivot ends, said pushing member being threadedly engaged with one of said pivot ends of said releasing member, said releasing member being movable relative to said casing between a first position, where said pushing member is disposed distal from said front opening in said casing, and a second position, where said pushing member is disposed proximate to said front opening in said frame;
    a coupler coupled fixedly to said tray and said frame;
    a front cover having a pivot end portion, a free end portion opposite to said pivot end portion and a middle portion that interconnects said pivot end portion, said pivot end portion being connected pivotably to said coupler, said front cover being provided with a tongue that extends outwardly from said middle portion and that is connected pivotably and directly to said pivot end of said releasing member, said front cover being pivotable relative to said from between a closed position, where said front cover covers said upper and lower end portions of said front opening of said frame and where said releasing member is disposed at a first position, and an open position, where said front cover uncovers said upper and lower end portions of said front opening of said frame and wherein said releasing member is disposed at a second position.

2. The disk-mounting assembly as claimed in claim 1, further comprising a retaining unit mounted on said casing and operable so as to retain releasably said front cover at a closed position.

3. The disk-mounting assembly as claimed in claim 1, further comprising a locking unit mounted on said casing and operable so as to lock said front cover at the closed position.

4. The disk-mounting assembly as claimed in claim 1, further comprising a rear cover that is disposed at said rear end of said tray and fastened to said brackets.

5. The disk-mounting assembly as claimed in claim 1, further comprising a reinforcing unit disposed at said rear end of said tray and fastened to said lateral walls of said tray.

6. The disk-mounting assembly as claimed in claim 1, further a top cover and a bottom cover.

* * * * *